Figure 1:
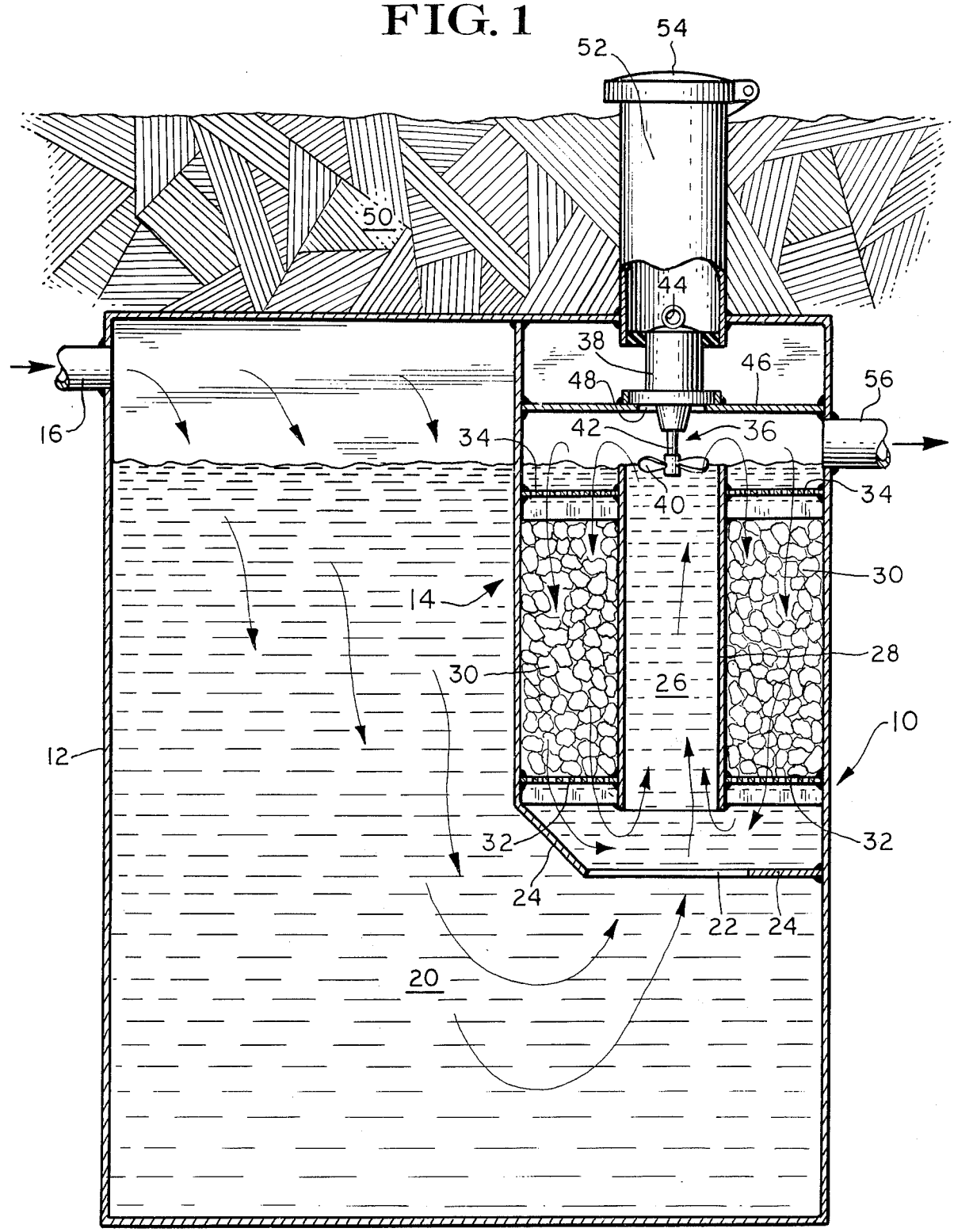

United States Patent
Mason et al.

[11] 3,966,608
[45] June 29, 1976

[54] LIQUID TREATMENT APPARATUS

[75] Inventors: Donald G. Mason, Overland Park; Robert B. Higgins, Lenexa, both of Kans.

[73] Assignee: Ecodyne Corporation, Lenexa, Kans.

[22] Filed: Mar. 1, 1974

[21] Appl. No.: 447,293

[52] U.S. Cl. ............ 210/151; 210/197; 210/205; 210/219; 261/91; 261/94
[51] Int. Cl.² ........................ B01D 33/34
[58] Field of Search ......... 210/68, 150, 151, 194, 210/195, 196, 197, 205, 208, 214, 219, 169, 532 S; 261/36 K, 91, 94, 98, 121 M

[56] References Cited
UNITED STATES PATENTS

| | | | |
|---|---|---|---|
| 2,051,727 | 8/1936 | Levine et al. | 210/150 X |
| 2,137,397 | 11/1938 | Haldeman | 261/121 M |
| 2,183,657 | 12/1939 | Page | 210/150 X |
| 3,167,600 | 1/1965 | Worman | 261/94 |
| 3,204,768 | 9/1965 | Daniel | 210/197 |
| 3,210,053 | 10/1965 | Boester | 210/208 |
| 3,360,460 | 12/1967 | Weston | 210/219 |
| 3,543,937 | 12/1970 | Choun | 210/150 |
| 3,576,316 | 4/1971 | Haelin | 261/91 |
| 3,662,890 | 5/1972 | Grimshaw | 210/205 |
| 3,753,897 | 8/1973 | Lin et al. | 210/197 |

Primary Examiner—Theodore A. Granger
Attorney, Agent, or Firm—Hume, Clement, Brinks, Willian, Olds & Cook, Ltd.

[57] ABSTRACT

An improved method and apparatus for treating liquor containing biodegradable wastes wherein the liquor is first delivered to a quiescent settling zone and then to an aeration zone. The aeration liquor is delivered downwardly through a column of submerged fixed media having a high surface area to volume ratio so that aerobic microorganisms can grow on their surface. The liquor is recirculated through the aeration zone and fixed media, and is withdrawn from the unit after treatment.

6 Claims, 2 Drawing Figures

LIQUID TREATMENT APPARATUS

The present invention relates to an improved method and apparatus for treating a liquor containing biodegradable wastes, and more particularly to an improved method and apparatus for treating sewage.

At the present time, most single-family homes and small multiple-family homes that are not connected to a central sewer system employ a septic tank system for the disposal of biodegradable wastes, particularly sewage. These tanks are generally of very low efficiency in processing these wastes, and, as a result, often tend to pollute the environment. Because of the well known pollution problems that are generated by septic tank systems, regulatory authorities in many areas have banned the use of such tanks, and it is expected that such bans will become more prevalent in the future. Accordingly, there is a need for a high-efficiency unit for the treatment of biodegradable wastes which is compact, inexpensive, and can be used to provide such treatment for single-family dwellings and small multiple-family dwellings.

Generally, the present invention provides an improved method for treating a liquor containing biodegradable wastes which comprises delivering the liquor to a quiescent settling zone, in which large particulates are permitted to settle to the bottom where they are subjected to digestion by anaerobic microorganisms. The liquor is delivered from the settling zone to an aeration zone, where it is aerated, and is then delivered downwardly through a column of submerged fixed media. The fixed media is composed of a multiplicity of elements which are freely and randomly stacked on one another to provide interstitial area between them. These elements have a high surface area to volume ratio, so that aerobic microorganisms can grow on their surface to treat biodegradable wastes contained in the liquor. As a result of their random stacking and high surface area, the elements promote homogeneous contact of the liquor with the fixed media. The liquor is received at the bottom of the fixed media and recirculated through the aeration zone and back through the fixed media in order to provide multiple passes through the media for thorough treatment. After such treatment, the effluent that has passed through the fixed media is withdrawn from the unit.

The invention also provides apparatus for carrying out the foregoing method which comprises a settling tank having an inlet communicating with an upper portion thereof together with a reactor chamber having inlet means communicating with the settling tank. A column of fixed media is disposed within the reactor chamber, and composed of a multiplicity of elements freely and randomly stacked over one another to provide interstitial area between them. The elements have a high surface area-to-volume ratio. Aeration means are also provided in the reactor chamber for introducing air into the liquor, and means are provided for delivering the liquor from the settling tank to the aeration means. The invention also includes means for delivering the liquor from the aeration means downwardly through the fixed media, together with means for recirculating the liquor through the fixed media. Finally, means are provided for withdrawing effluent from the reactor.

Figure 2:
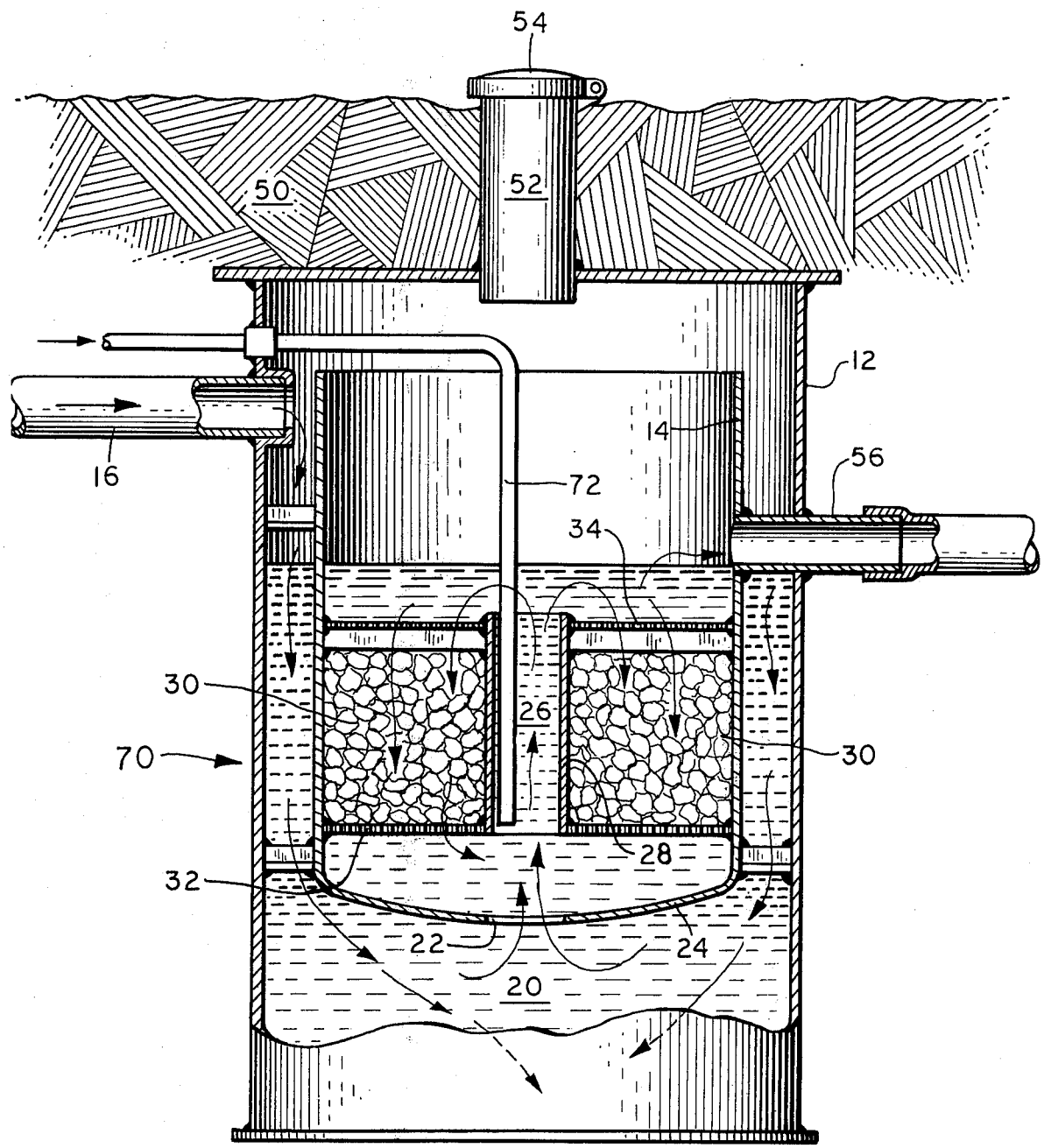

The invention, its construction and method of operation, together with the objects and advantages thereof will be best understood by reference to the following detailed description, taken in conjunction with the drawings, in which:

FIG. 1 is a cross-sectional view of an apparatus embodying the features of the present invention; and FIG. 2 is a cross-sectional view of a second apparatus embodying the features of the present invention.

Referring to FIG. 1, a liquid treatment apparatus embodying the features of the present invention is generally indicated by reference numeral 10. This apparatus 10 includes a tank 12, made of suitable material such as fiberglass, steel, plastic, or the like, within which is disposed a reactor, generally indicated by reference numeral 14. As will be understood in connection with the description of the invention, it is not essential that the reactor 14 be disposed within the tank 12. However, this is a particularly convenient and preferred arrangement, since a single, self-contained unit is provided which is easy to install and maintain.

In the embodiment shown, the tank 12 has a square cross-sectional configuration when viewed from the top. Of course, such a shape is not critical, and other rectangular cross-sectional configuration could be employed. The tank 12 has an inlet pipe 16 communicating with an upper portion thereof. The main portion of the tank 12 forms a settling and anaerobic digestion area 20.

The reactor 14 occupies only a small portion of the tank 12, and is normally of rectangular cross-sectional configuration when seen in plan view, extending alone one side of the tank 12. Thus, three of the walls of the tank 12 also form walls of the reactor 14.

The reactor 14 has an opening 22 in the bottom thereof, formed by baffles 24. Liquid from the settling and anaerobic digestion area 20 passes into the reactor 14 through the opening 22. As shown in the drawing, it is essential that the bottom of the reactor 14 be located a distance above the bottom of the tank 12, so that solids can settle to the bottom of the tank 12 while liquid passes into the reactor 14.

The reactor 14 comprises a central vertical flow passageway 26, which is formed of a piece of piping 28. The flow passageway 26 is surrounded by fixed media 30 which is contained between the walls of the reactor 14 and the central flow passageway 26. The fixed media 30 rests on a perforated floor 32, which has openings that are preferably as large as possible without permitting the fixed media 30 to pass therethrough. The fixed media 30 is also covered with a perforated cover 34, similar to the perforated floor 32, although less strength may be required because there is no need to support the fixed media 30.

The fixed media 30 may be any suitable material having a high ratio of void space to volume. Preferably, such material should have at least about 90% void volume to produce a high surface area to volume ratio and a low impedance to liquid flow. Such void volume may be measured by pouring the fixed media into water in a graduated cylinder and noting the volume of water displaced by a given volume of fixed media. For example, if the fixed media were poured into water having a volume of one liter to a level even with the one liter volume, 100 ml of water would be displaced by fixed media having 90% void volume.

The fixed media 30 should also have a surface which is receptive to aerobic microbial growth. By way of example, a plastic tower packing media composed of polypropylene "Flexirings" manufactured by the Koch Engineering Co., Inc., of Wichita, Kansas, has been found suitable. "Flexirings" of a ⅝-inch nominal size and having a surface area of 100 square feet per cubic foot have been found to be suitable for use in the present invention. In a prototype system, 3½-inch "Flexirings" providing 28 square feet of surface area per cubic foot have also been effectively utilized. It will be recognized by those skilled in the art that other types of fixed media, such as other types of power packing media, may be employed in the present invention. For example, Raschig and Pall Rings and saddle (e.g. Berl) type packing may be used in the invention, as well as any other materials having a high surface area to volume ratio which are receptive to the surface growth of microorganisms. This fixed media is randomly stacked within the reactor 14, and provides a large amount of interstitial area both within and between the packing media pieces. Thus, liquid flowing downwardly through the fixed media 30 constantly divides and recombines in streams to provide constant homogeneous mixing and intimate association with the surface of the packing media so that highly efficient aerobic digestion is provided.

In order to provide for aerobic digestion of bacteria, it is essential that an aeration zone be provided. As shown in FIG. 1, this particular apparatus employs a mechanical surface aerator generally 36 having a motor 38 which drives an aeration impeller 40 through a shaft 42. The motor 38 has a lifting eye 44, and is mounted on a shelf 46 having an opening 48 through which the shaft 42 and impeller 40 pass. The impeller 40 has an appearance similar to a marine propeller, and is pitched to draw liquid upwardly through the central flow passageway 26, and to aerate and distribute the liquor over the top of the fixed media 30.

In the preferred embodiment shown, the liquid treatment apparatus 10 is buried in the earth 50. Access to the surface is provided by an air and service passageway 52 having a vented cap 54. The air and service passageway 52 communicates with the reactor 14 at a position directly above the electric motor 38. The motor 38 preferably has an internal cooling fan (not shown) which draws air downwardly through the passageway 52 and the motor 38, and delivers it to the impeller 40, providing a constant source of fresh air for the reactor 14.

Treated liquid flows out of the reactor 14 through an effluent pipe 56 which is located at a level above the top of the fixed media 30. As can be seen in the drawing, the position of the effluent pipe 56 controls the level of liquid both in the reactor 14 and in the settling and anaerobic digestion area 20. It is important that the impeller 40 be positioned approximately at the surface of the liquid within the reactor 14, so that it may mix air with the liquor passing through the reactor 14 after it emerges from the central flow passageway 26.

The motor 38, along with its associated impeller 40 and shaft 42, can be removed from the reactor 14 through the vented cap 54 by simply grasping the lifting eye 44 with a suitable implement and withdrawing the motor through the air and service passageway 52. This permits easy access to the motor for service, and also permits access to the bottom of the settling and anaerobic digestion area 20 through the central flow passageway 26, so that a tube may be inserted to periodically pump out solids that have settled in the settling and anaerobic digestion area 20 when the unit is serviced.

FIG. 2 shows a second embodiment of a liquid treatment apparatus in accordance with the present invention, generally indicated by reference numeral 70. This apparatus 70 is basically the same as the apparatus 10 shown in FIG. 1, except that the tank 12 is generally cylindrical in configuration, and the reactor 14 is also generally cylindrical, and occupies a central, coaxial area within the tank 12. Because the parts of the apparatus 70 shown in FIG. 2 correspond to those of the liquid treatment apparatus 10 shown in FIG. 1, corresponding parts have been indicated by like reference numerals, and the description of FIG. 1 is fully applicable to FIG. 2, except where the shapes of the tank 12 and reactor 14 are referred to. One significant difference, however, is that the embodiment of FIG. 2 employs a different type of aeration means. In place of a motor-driven impeller, the embodiment of FIG. 2 employs an air line 72 which passes through the wall of the tank 12 and into the central flow passageway 26 of the reactor 14. This air line is connected to a compressor (not shown) or other suitable source of air under pressure, which delivers air directly to the bottom of the central passageway 26. The rising air bubbles produce a motive force which recirculates the liquid through the fixed media 30.

In operation, referring simultaneously both to FIGS. 1 and 2, a liquor containing biodegradable wastes, generally in both dissolved and undissolved forms, is delivered to the tank 12 through the inlet pipe 16. The liquid passes into the settling and anaerobic digestion area 20, which is relatively quiescent due to the low flow rates and lack of agitation. Floatable materials are degraded on the surface of the settling and anaerobic digestion area 20 after degradation, any remaining solids will settle to the bottom of tank 12. A large portion of the particulate matter contained in the liquor settles to the bottom of the tank 12, where it is digested by the anaerobic bacteria which exists within the biodegradable material.

The liquor passes from the settling and anaerobic digestion area into the reactor 14 through the opening 22 in the lower portion thereof. The liquid then passes upwardly through the central flow passageway 26. This upward movement is produced by the impeller 40 in the embodiment shown in FIG. 1, and by the upwardly rising stream of air bubbles introduced through the air line 72 in the embodiment of FIG. 2.

After the liquid reaches the top of the central flow passageway 26, it is distributed in a relatively even manner over the top of the fixed media 30. The liquor passes downwardly through the fixed media 30 where is is aerobically digested by the microorganisms on the surface thereof. Any solids that are released from the fixed media 30 pass downwardly into the settling and anaerobic digestion area 20, where they may be periodically collected.

After the liquor has made a pass through the fixed media 30, it again passes upwardly through the central flow passageway 26, and is recirculated through the fixed media. This recirculation occurs a number of times before the liquor is withdrawn from the unit through the effluent pipe 56.

Obviously, many modifications and variations of the invention as hereinbefore set forth will occur to those skilled in the art, and it is intended to cover in the appended claims all such modifications and variations as fall within the true spirit and scope of the invention.

We claim:

1. Improved apparatus for treating a liquor containing biodegradable wastes comprising: a settling tank having an inlet communicating with an upper portion thereof; a reactor chamber disposed within said settling tank, said reactor chamber having lower inlet means communicating with said settling tank, a perforated floor portion, and a vertical flow passageway; a column of fixed media within said reactor chamber on said perforated floor portion and surrounding said flow passageway, said media being composed of a multiplicity of elements freely and randomly stacked on one another to provide interstitial areas therebetween, said elements having a high surface area to volume ratio; aeration means in said reactor chamber for introducing air into said liquor; means for delivering said liquor from said aeration means downwardly through said fixed media; means for recirculating said liquor through said fixed media and said central flow passageway; and means for withdrawing effluent from an upper portion of said reactor.

2. The apparatus as defined in claim 1 wherein said aeration means comprise an impeller positioned at the top of said central flow passageway, a motor positioned above said impeller, and a drive shaft connecting said impeller to said motor, said motor have a cooling fan for delivering air downwardly through said motor to said impeller.

3. The apparatus as defined in claim 1 wherein said flow passageway is centrally located within said reactor chamber.

4. The apparatus as defined in claim 1 wherein said fixed media comprises plastic material having an open area which is at least 90% of the total volume of said fixed media.

5. The apparatus as defined in claim 1 wherein said aeration means comprises an air line communicating with said flow passageway.

6. Improved apparatus for treating a liquor containing biodegradable wastes comprising: a settling tank having an inlet communicating with an upper portion thereof; a reactor chamber disposed within said settling tank, said reactor chamber having a lower inlet, a perforated floor portion, and a central, vertical flow passageway; a column of fixed media within said reactor chamber on said perforated floor portion and surrounding said flow passageway, said media being composed of a multiplicity of plastic elements freely and randomly stacked on one another to provide interstitial areas therebetween, said elements having an open area which is at least about 90% of the total volume of said media; an impeller positioned at the top of said flow passageway for drawing liquid upwardly through said flow passageway and for aerating said liquid; a motor positioned above said impeller; a drive shaft connecting said impeller to said motor, said motor having a cooling fan for delivering air downwardly through said motor to said impeller; means for recirculating said liquor through said fixed media and said central flow passageway; and means for withdrawing effluent from said reactor.

* * * * *